US008992364B2

(12) United States Patent
Law et al.

(10) Patent No.: US 8,992,364 B2
(45) Date of Patent: Mar. 31, 2015

(54) DIRECT DRIVE FOR EXERCISE MACHINES

(71) Applicant: ICON Health & Fitness, Inc., Logan, UT (US)

(72) Inventors: Greg Law, Smithfield, UT (US); Rick Hendricksen, River Heights, UT (US); Paul Ricks, Petersboro, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 241 days.

(21) Appl. No.: 13/758,795

(22) Filed: Feb. 4, 2013

(65) Prior Publication Data
US 2013/0199317 A1 Aug. 8, 2013

Related U.S. Application Data

(60) Provisional application No. 61/595,071, filed on Feb. 4, 2012.

(51) Int. Cl.
F16H 19/08 (2006.01)
A63B 71/06 (2006.01)
A63B 21/22 (2006.01)
A63B 22/00 (2006.01)
A63B 22/06 (2006.01)
A63B 23/035 (2006.01)
A63B 23/04 (2006.01)

(52) U.S. Cl.
CPC ........... F16H 19/08 (2013.01); Y10T 74/18232 (2015.01); A63B 71/0619 (2013.01); A63B 21/225 (2013.01); A63B 22/001 (2013.01); A63B 22/0048 (2013.01); A63B 22/0061 (2013.01); A63B 22/0664 (2013.01); A63B 23/03516 (2013.01); A63B 23/0423 (2013.01); A63B 2022/067 (2013.01); A63B 2022/0676 (2013.01); A63B 2022/0682 (2013.01)
USPC .......................................................... 475/33

(58) Field of Classification Search
CPC ...................................................... F16H 19/08
USPC ......................................... 475/330, 337, 349
See application file for complete search history.

(56) References Cited

U.S. PATENT DOCUMENTS

| 105,055 | A | * | 7/1870 | Dull .............................. 475/331 |
| 4,077,278 | A | * | 3/1978 | Combastet .................... 475/330 |
| 6,019,710 | A | | 2/2000 | Dalebout et al. |
| 6,875,160 | B2 | | 4/2005 | Watterson et al. |
| 7,425,188 | B2 | | 9/2008 | Ercanbrack et al. |
| 7,604,573 | B2 | | 10/2009 | Dalebout et al. |
| 7,618,350 | B2 | | 11/2009 | Dalebout et al. |
| 8,876,669 | B2 | * | 11/2014 | Vujicic ............................. 482/63 |
| 2004/0102291 | A1 | * | 5/2004 | Eschenbach .................... 482/52 |

OTHER PUBLICATIONS

Relay Fitness Group Product Catalog 2012, copyright 2012, 23 pages.

* cited by examiner

Primary Examiner — Jacob S Scott
(74) Attorney, Agent, or Firm — Holland & Hart LLP

(57) ABSTRACT

An exercise machine includes a support structure, a crank shaft rotatably mounted on the support structure, a first planetary gear set operatively coupled to the crank shaft so that the crank shaft provides an input for the first planetary gear set, a second planetary gear set operatively coupled to the first planetary gear set so that an output of the first planetary gear set provides an input for the second planetary gear set, and a flywheel rotatably operatively coupled to the second planetary gear set so that an output of the second planetary gear set rotates the flywheel.

23 Claims, 12 Drawing Sheets

DIRECT DRIVE FOR EXERCISE MACHINES

RELATED APPLICATIONS

This application claims the benefit under 35 U.S.C. §119 (e) of U.S. Provisional Patent Application No. 61/595,071 filed Feb. 4, 2012 titled "Direct Drive for Exercise Machines." The provisional application is incorporated herein by reference in its entirety.

TECHNICAL FIELD

This disclosure relates generally to elliptical exercise machines and, in particular, to an elliptical exercise machine having a direct drive with planetary gear sets.

BACKGROUND

Exercise machines having alternating reciprocating foot supports configured to traverse or travel about a closed path to simulate a striding, running, walking, and/or a climbing motion for the individual using the machine are well known in the art, and are commonly referred to as elliptical exercise machines or elliptical cross-trainers. In general, an elliptical or elliptical-type exercise machine comprises a pair of reciprocating foot supports designed to receive and support the feet of a user. Each reciprocating foot support has at least one end supported for rotational motion about a pivot point or pivot axis, with the other end supported in a manner configured to cause the reciprocating foot support to travel or traverse a closed path, such as a reciprocating elliptical or oblong path or other similar geometric outline. Therefore, upon operation of the exercise machine to rotate the proximal end, each reciprocating foot support is caused to travel or traverse the closed path. The reciprocating foot supports are configured to be out of phase with one another by 180° in order to simulate a proper and natural alternating stride motion. One example of an elliptical exercise machine is provided in U.S. Pat. No. 7,604,573, issue to Dalebout et al. on Oct. 20, 2009, which is expressly incorporated by reference herein.

An individual may utilize an elliptical or elliptical-type exercise machine by placing his or her feet onto the reciprocating foot supports. The individual may then actuate the exercise machine for any desired length of time to cause the reciprocating foot supports to repeatedly travel their respective closed paths, which action effectively results in a series of strides achieved by the individual to obtain exercise, with a low-impact advantage. An elliptical or elliptical-type machine may further comprise mechanisms or systems for increasing the resistance of the motion, and/or for varying the vertical elevation or height of the closed path. The resistance and elevation mechanisms or systems function when the individual is striding forward, and when the individual is driving in reverse to simulate walking backward. In addition, the reciprocating motion of the feet to achieve a series of strides may be complemented by a reciprocating movement of the arms, whether assisted by the exercise machine via a suitably configured mechanism or system, or unassisted.

The Dalebout et al. patent referenced above provides one example of an elliptical exercise machine wherein the driven components and the resistance components are located at the rear of the exercise machine. Additional examples of exercise machines with rear mounted components are provided in U.S. Pat. No. 6,875,160, issued to Watterson et al. on Apr. 5, 2005, and U.S. Pat. No. 7,425,188, issue to Ercanbrack et al. on Sep. 16, 2008. Alternatively, the driven components and resistance components may be mounted at the front of the exercise machine. Examples of such front mounted exercise machines include U.S. Pat. No. 6,019,710, issued to Dalebout et al. on Feb. 1, 2000, and U.S. Pat. No. 7,618,350, issued to Dalebout et al. on Nov. 17, 2009. Each of these patents is expressly incorporated by reference herein.

A typical closed path may comprise a generally horizontal outline having a longitudinal axis there through. Depending upon the exercise machine, a closed path may be many different sizes. As such, a particular measurement of interest to individuals with respect to an elliptical or elliptical-type exercise machine is "stride length." A stride length is essentially a measurement of the distance separating the two furthest points along the longitudinal axis of the closed path. Therefore, upon actuation of the exercise machine, a single stride may be referred to as travel by the reciprocating foot support, and therefore the foot of a user, along the closed path from a first endpoint on the longitudinal axis of the closed path to a distal distant endpoint, also on the longitudinal axis. The stride and the upper resulting stride length provided by an exercise machine, although simulated and possibly modified, is comparable to a single stride achieved during natural and/or modified gait of an individual.

Many of the currently known elliptical exercise machines implement drive mechanisms incorporating a series of pulleys, belts and cables to translate the strides of the users of the elliptical exercise machines into rotational motion of the drive mechanisms. For example, in the Watterson et al. patent, the user's strides cause crank arms to rotate a flywheel that is connected to a drive by a belt to in turn rotate a weighted wheel to conserve momentum and maintain reciprocating displacement of the foot supports. In the Dalebout et al. '350 patent, reciprocating foot supports are connected to a drive assembly by crank arms to rotate the drive assembly, which then rotates a separate resistance assembly that is disposed below the drive assembly. As can be seen by these examples, the concatenation of multiple elements and assemblies can greatly increase the amount of space assumed by the rotating elements. Correspondingly, large covers are required to house the rotating elements to allow for safe operation of the elliptical exercise machines. For these reasons, a need exists for a new technology for transferring the motion of the user's strides to the driven elements of the resistance elements of elliptical exercise machines.

SUMMARY OF THE DISCLOSURE

In one aspect of the disclosure, an exercise machine includes a support structure, a crank shaft rotatably mounted on the support structure, and a first planetary gear set. The first planetary gear set includes a first sun gear rotatably mounted on the crank shaft, a first planet carrier mounted on the crank shaft and secured thereto for rotation with the crank shaft, a first planet gear rotatably mounted on the first planet carrier and meshing with the first sun gear, and a first ring gear encircling and meshing with the first planet gear. The exercise machine further includes a second planetary gear set having a second sun gear rotatably mounted on the crank shaft, a second planet carrier rotatably mounted on the crank shaft, a second planet gear rotatably mounted on the second planet carrier and meshing with the second sun gear, and a second ring gear encircling and meshing with the second planet gear. The first planetary gear set is operatively connected to the second planetary gear set such that an output rotation of the first planetary gear set causes an input rotation of the second planetary gear set. Still further, the exercise machine includes a flywheel rotatably mounted on the crank shaft and being operatively connected to the second planetary gear set such that output rotation of the second planetary gear set causes rotation of the flywheel.

In one or more other aspects that may be combined with any of the aspects herein, the first sun gear is secured to the second planet carrier for rotation therewith so that an output rotation of the first sun gear rotates the second planet carrier to cause an input rotation of the second planetary gear set, and wherein the second sun gear is secured to the flywheel for rotation therewith so that an output rotation of the second sun gear rotates the flywheel.

In one or more other aspects that may be combined with any of the aspects herein, the exercise machine includes a first crank arm having a first end rigidly attached to one end of the crank shaft and extending radially from the crank shaft and terminating at a second end, a second crank arm having a first end rigidly connected to an opposite end of the crank shaft from the first crank arm and extending radially from the crank shaft in a direction 180° out of phase with the first crank arm and terminating at a second end, a first reciprocating foot support having a first end pivotally linked to the second end of the first crank arm, and a second reciprocating foot support having a first end pivotally linked to the second end of the second crank arm, wherein the first and second reciprocating foot supports each have second ends operatively connected to the support structure so that the first and second reciprocating foot supports travel about closed paths having a stride length upon rotation of the crank shaft.

In one or more other aspects that may be combined with any of the aspects herein, the first planetary gear set comprises three first planet gears rotatably mounted on and circumferentially spaced around the first planet carrier and meshing with the first sun gear and the first ring gear, wherein the second planetary gear set comprises three second planet gears rotatably mounted on and circumferentially spaced around the second planet carrier meshing with the second sun gear and the second ring gear.

In one or more other aspects that may be combined with any of the aspects herein, the first planetary gear set has a gear ratio of 5 to 1.

In one or more other aspects that may be combined with any of the aspects herein, the first sun gear comprises 48 gear teeth, the first planet gear comprises 72 gear teeth and the first ring gear comprises 192 gear teeth.

In one or more other aspects that may be combined with any of the aspects herein, the first ring gear comprises an annular first ring outer housing and a first inner ring gear having gear teeth and being disposed within the first ring outer housing.

In one or more other aspects that may be combined with any of the aspects herein, the second planetary gear set has a gear ratio of 5 to 1.

In one or more other aspects that may be combined with any of the aspects herein, the second sun gear comprises 48 gear teeth, the second planet gear comprises 72 gear teeth and the second ring gear comprises 192 gear teeth.

In one or more other aspects that may be combined with any of the aspects herein, the second ring gear comprises an annular second ring outer housing and a second inner ring gear having gear teeth and being disposed within the second ring outer housing.

In one or more other aspects that may be combined with any of the aspects herein, a first gear ratio of the first planetary gear set is equal to a second gear ratio of the second planetary gear set.

In one or more other aspects that may be combined with any of the aspects herein, a ratio of a number of rotations of the flywheel to a number of rotations of the crank shaft is 25 to 1.

In one or more other aspects that may be combined with any of the aspects herein, a ratio of a number of rotations of the flywheel to a number of rotations of the crank shaft is 49 to 1.

In one or more other aspects that may be combined with any of the aspects herein, a first gear ratio of the first planetary gear set is not equal to a second gear ratio of the second planetary gear set.

In one or more other aspects that may be combined with any of the aspects herein, the crank shaft, the first and second planetary gear sets and the flywheel are disposed proximate a rearward end of the support structure.

In one or more other aspects that may be combined with any of the aspects herein, the crank shaft, the first and second planetary gear sets and the flywheel are disposed proximate a forward end of the support structure.

In one or more other aspects that may be combined with any of the aspects herein, an elliptical exercise machine includes a support structure, a crank shaft rotatably mounted on the support structure, a first planetary gear set operatively coupled to the crank shaft so that the crank shaft provides an input for the first planetary gear set, a second planetary gear set operatively coupled to the first planetary gear set so that an output of the first planetary gear set provides an input for the second planetary gear set, and a flywheel rotatably operatively coupled to the second planetary gear set so that an output of the second planetary gear set rotates the flywheel.

In one or more other aspects that may be combined with any of the aspects herein, the elliptical exercise machine includes a first crank arm having a first end rigidly attached to one end of the crank shaft and extending radially from the crank shaft and terminating at a second end, a second crank arm having a first end rigidly connected to an opposite end of the crank shaft from the first crank arm and extending radially from the crank shaft in a direction 180° out of phase with the first crank arm and terminating at a second end, a first reciprocating foot support having a first end pivotally linked to the second end of the first crank arm, and a second reciprocating foot support having a first end pivotally linked to the second end of the second crank arm, wherein the first and second reciprocating foot supports each have second ends operatively connected to the support structure so that the first and second reciprocating foot supports travel about closed paths having a stride length upon rotation of the crank shaft.

In one or more other aspects that may be combined with any of the aspects herein, a direct drive mechanism for an elliptical exercise machine includes a crank shaft rotatably mounted on a support structure of the elliptical exercise machine, a first planetary gear set, and a second planetary gear set. The first planetary gear set includes a first sun gear rotatably mounted on the crank shaft, a first planet carrier mounted on the crank shaft and secured thereto for rotation with the crank shaft, three first planet gears rotatably mounted on and circumferentially spaced around the first planet carrier and meshing with the first sun gear, and a first ring gear encircling and meshing with the first planet gears. The second planetary gear set includes a second sun gear rotatably mounted on the crank shaft, a second planet carrier rotatably mounted on the crank shaft and having the first sun gear secured thereto for rotation there with, three second planet gears rotatably mounted on and circumferentially spaced around the second planet carrier and meshing with the second sun gear, and a second ring gear encircling and meshing with the three second planet gears. The direct drive mechanism further includes a flywheel rotatably mounted on the crank shaft and having the second sun gear secured thereto for rotation there with.

In one or more other aspects that may be combined with any of the aspects herein, the direct drive mechanism including a first crank arm having a first end rigidly attached to one end of the crank shaft and extending radially from the crank shaft and terminating at a second end, and a second crank arm having a first end rigidly connected to an opposite end of the crank shaft from the first crank arm and extending radially from the crank shaft in a direction 180° out of phase with the first crank arm and terminating at a second end.

Additional aspects are defined by the claims of this patent.

DETAILED DESCRIPTION

Figure 1:
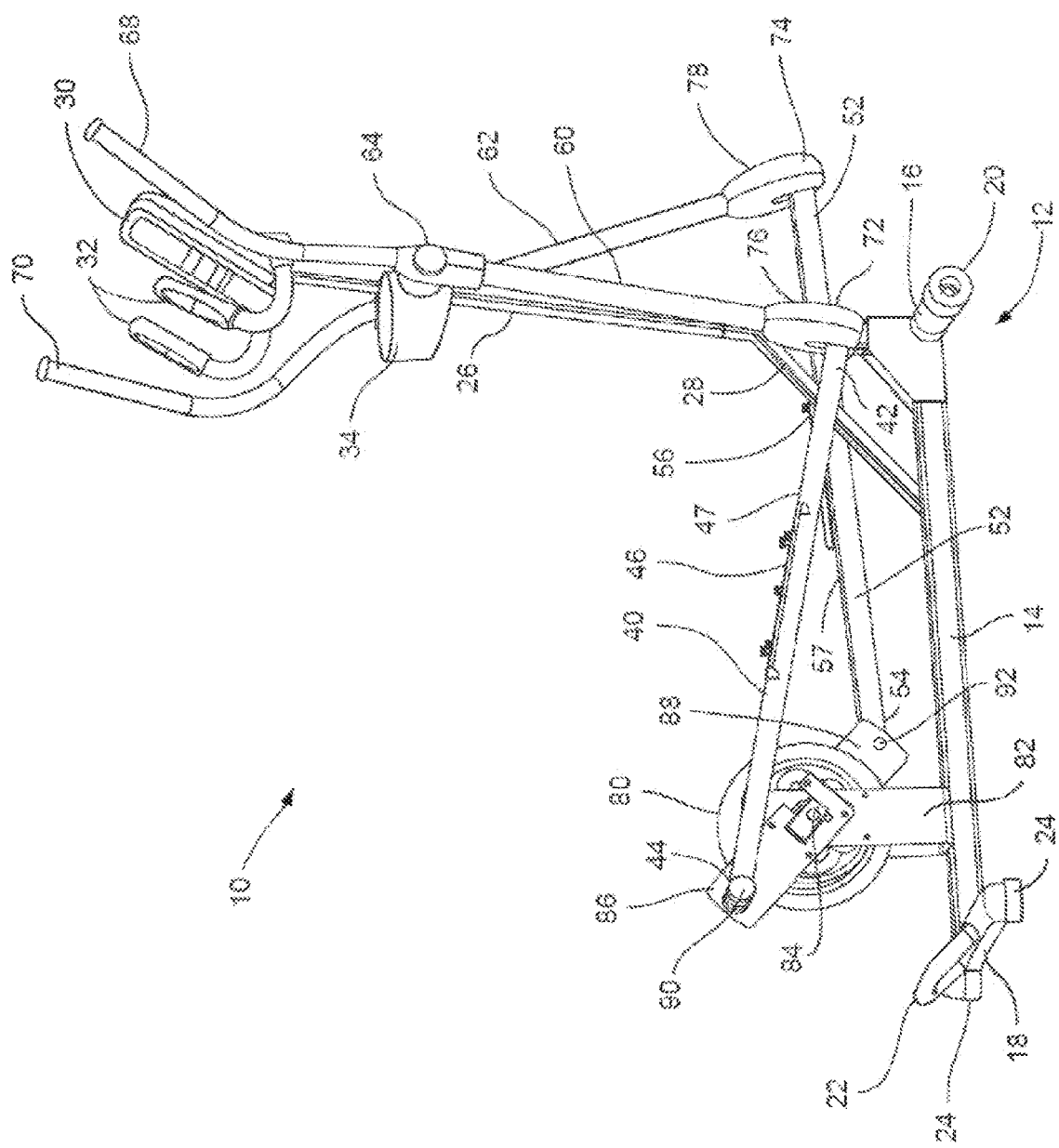
FIGS. 1 and 2 are right and the left side pictorial views of an elliptical exercise machine having a direct drive in accordance with the present disclosure.
Figure 2:
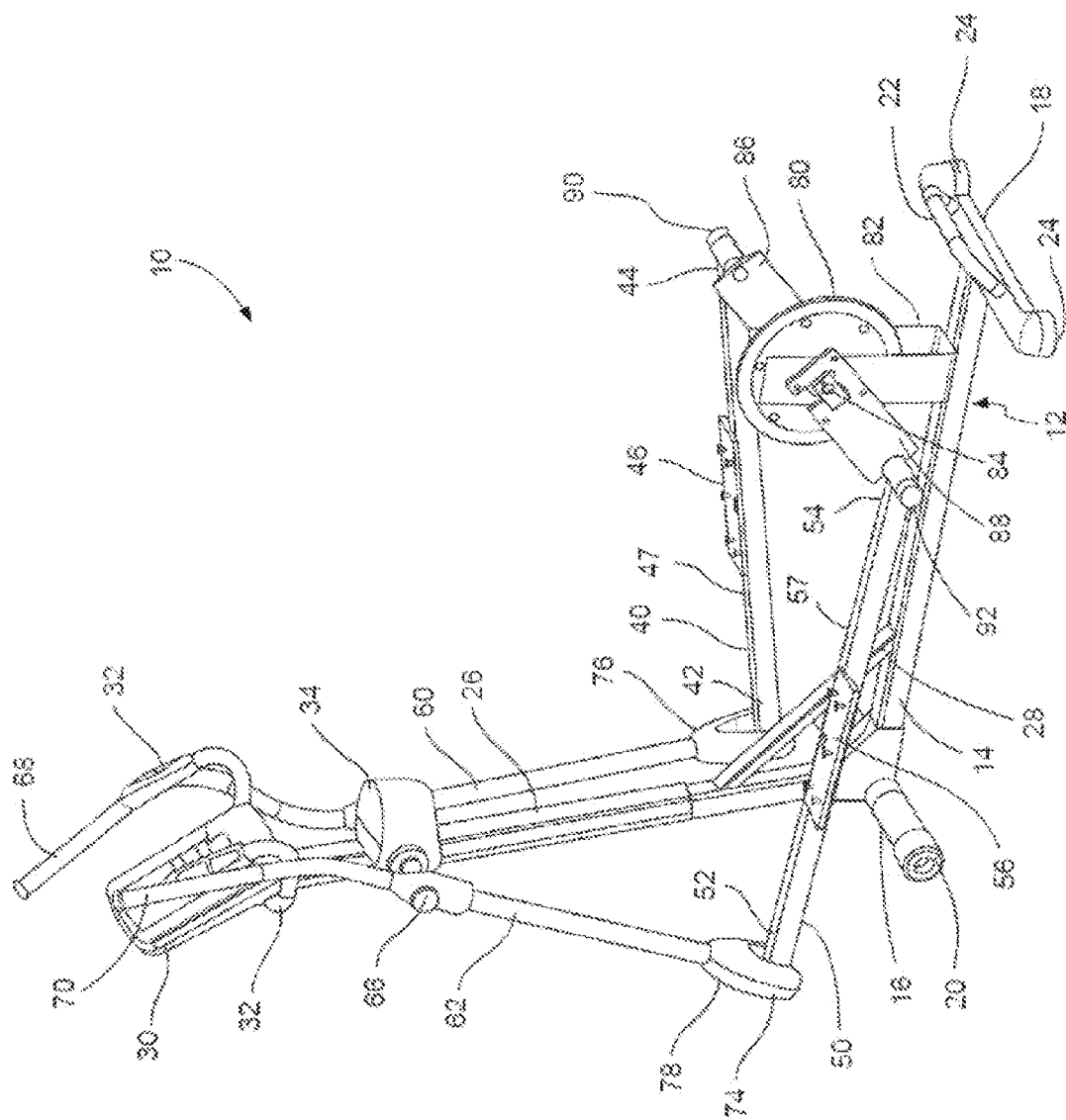

Direct drive mechanisms in accordance with the present disclosure may be implemented in a wide variety of exercise machines wherein an input movement of a user, such as walking, running, climbing, rowing, swimming and the like, causes a corresponding output rotation of the direct drive mechanism used in a resistance mechanism controlling the intensity of the user's workout. Such exercise machines in which direct drive mechanisms may be implemented include elliptical trainers, treadmills, stair trainers, stationary upright and recumbent bicycles and rowing machines. With reference to FIGS. 1 and 2, illustrated is a perspective view of an elliptical exercise machine 10 according to one exemplary embodiment of the present invention. The illustrated elliptical exercise machine 10 may be considered a rear mount, or rear mechanical type exercise machine. However, those skilled in the art will understand that the drive mechanism may be implemented in front and mid mechanical type exercise machines as well, and that the illustration of the rear mount elliptical exercise machine 10 is merely exemplary.

The elliptical exercise machine 10 may have a support structure 12 that is configured to provide both structural and translational support to the components of the exercise machine 10, and also to interface with the ground. In the illustrated embodiment, the support structure 12 may include an I-beam base configuration having a longitudinal support beam 14 functioning as the primary support member, and front and rear lateral cross beams 16, 18, respectively, located at and extending in opposing directions from each end of the longitudinal support beam 14. The front cross beam 16 may include wheels 20 rotatably mounted on either side, and the rear cross beam 18 may include a handle 22 by which a user may lift the rear end of the exercise machine 10 and roll the exercise machine 10 across the supporting surface to reposition the exercise machine 10. Rubber or plastic caps 24 may be situated on either end of the rear cross beam 18 to protect the supporting surface upon which the support structure 12 rests.

A vertical or upright support 26 may extend upwardly from the longitudinal support beam 14 to support the forward components of the exercise machine 10. A strut 28 may be connected between the longitudinal support beam 14 and the vertical support 26 for additional structural support. The vertical support 26 may comprise or support various known items or assemblies, such as a user interface or control console 30, fixed handle bars 32, cup holders 34, magazine or book racks, and the like.

FIGS. 1 and 2 further illustrate the elliptical exercise machine 10 having a first reciprocating foot support 40 disposed on one side of the support structure 12 and having a first end 42, a second end 44, and a corresponding foot pedal mount 46 provided thereon and located between the first end 42 and the second end 44. Complementing the first reciprocating foot support 40 is a second reciprocating foot support 50 disposed on the opposite side of the support structure 12 and having a first end 52, a second end 54, and a corresponding foot pedal mount 56 provided thereon and located between the first end 52 and the second end 54. The foot pedal mounts 46, 56 may be configured for attachment of foot pads upon which the user stands while operating the elliptical exercise machine 10. The first and second reciprocating foot supports 40, 50 are laterally spaced apart from one another such that the foot pads are positioned to comfortably receive the respective feet of a user and facilitate the performance of a striding motion with the user facing in the forward direction. While the embodiment is illustrated with the foot pedal mounts 46, 56, it is also noted that the reciprocating foot supports 40, 50 may be alternatively configured without foot pedal mounts 46, 56, and the corresponding foot pads, and with the user standing directly on upper surfaces 47, 57 of the reciprocating foot supports 40, 50, respectively. In this embodiment, the upper surfaces 47, 57 are sized to accommodate a foot of the user, and may optionally have a non-slip material or other finish applied thereto.

The first ends 42, 52 of the first and second reciprocating foot supports 40, 50, respectively, may be supported in any way commonly known in the art to enable the operation of the exercise machine 10, and particularly the reciprocating motion of the reciprocating foot supports 40, 50. In one exemplary embodiment, the first ends 42, 52 of the reciprocating foot supports 40, 50 may be operatively connected to the support structure 12 by corresponding swing arms 60, 62, respectively, such as illustrated in FIGS. 1 and 2. The swing arms 60, 62 may be pivotally connected to the vertical support 26 at pivot axes 64, 66, respectively, to pivot about a horizontal axis. Portions of the swing arms 60, 62, above the pivot axes 64, 66 may be formed into handles 68, 70 that may be grasped by a user of the exercise machine 10 for balance and to exercise the muscles of the upper portion of the user's body.

At the lower ends of the swing arms 60, 62, the first ends 42, 52 of the reciprocating foot supports 40, 50 may be pivotally connected by pivot points 72, 74, which may be covered by covers 76, 78. The constraint of the swing arms 60, 62 causes the first ends 42, 52 of the reciprocating foot supports 40, 50 to swing back and forth in arcuate paths as the reciprocating foot supports 40, 50 move through their elliptical paths. Travel about this arcuate closed path provides a substantially horizontal forward-rearward component of motion that effectively simulates a user's stride. Due to the coupling configuration of the reciprocating foot supports 40, 50 at each of their ends, the closed path traveled by the foot pedal mounts 46, 56 is generally elliptical in nature, with the majority of the path comprising a horizontal component, although a vertical component is also present. In another exemplary embodiment, the first ends 42, 52 may comprise rollers that glide along corresponding guide tracks to constrain their motion to linear or arcuate paths. One example of such an arrangement is provided in the Watterson et al. patent referenced above. In these and other alternate embodiments, mechanisms may be provided in the exercise machine to vary the elevation of the first ends 42, 52 to simulate striding uphill at different inclines.

In the illustrated embodiment, the driven mechanisms are disposed at the rear of the elliptical exercise machine 10. For simplicity of explanation and understanding, and covers for the components of the rear of the exercise machine 10 are not shown in the drawing figures. However, appropriate covers will be apparent to those skilled in the art, and are contemplated by the inventors as being able to be implemented in elliptical exercise machines 10 in accordance with the present disclosure. The driven mechanism of elliptical exercise machine 10 is shown in the drawings, and may include a direct drive 80 mounted to the support structure 12 proximate the rear cross beam 18. A crank mount 82 may extend upwardly from a rear portion of the longitudinal support beam 14 for securing the direct drive 80 to the support structure 12. The crank mount 82 may include openings in which bushings (not shown) are disposed for rotatably connecting a crank shaft 84 of the direct drive 80 thereto. The crank shaft 84 extends outwardly on either side of the crank mount 82 for attachment of drive components of the exercise machine 10.

The drive components of the direct drive 80 may be implemented in the form of crank arms 86, 88. Each crank arm 86, 88 may have a first end rigidly attached to a corresponding end of the crank shaft 84 and extend radially from the crank shaft 84 and terminate at a second end. The second end of each of the crank arms 86, 88 may have a corresponding axle 90, 92 extending outwardly away from the direct drive 80 along lines approximately parallel to a longitudinal axis of the crank shaft 84. The second ends 44, 54 of the reciprocating foot supports 40, 50 may be rotatably connected to the corresponding axles 90, 92. Attached in this way, the second ends 44, 54 are constrained by the crank arms 86, 88 to move in circular paths about the crank shaft 84 of the direct drive 80. The crank arms 86, 88 may be secured in a fixed relationship with respect to one another and configured to travel along identical repeating circular paths about the crank shaft 84. The crank arms 86, 88 may further be configured to be out of phase with one another by approximately 180° in order to facilitate an alternating reciprocating motion by the reciprocating foot supports 40, 50 and to simulate the natural alternating strides of a user.

Figure 3:
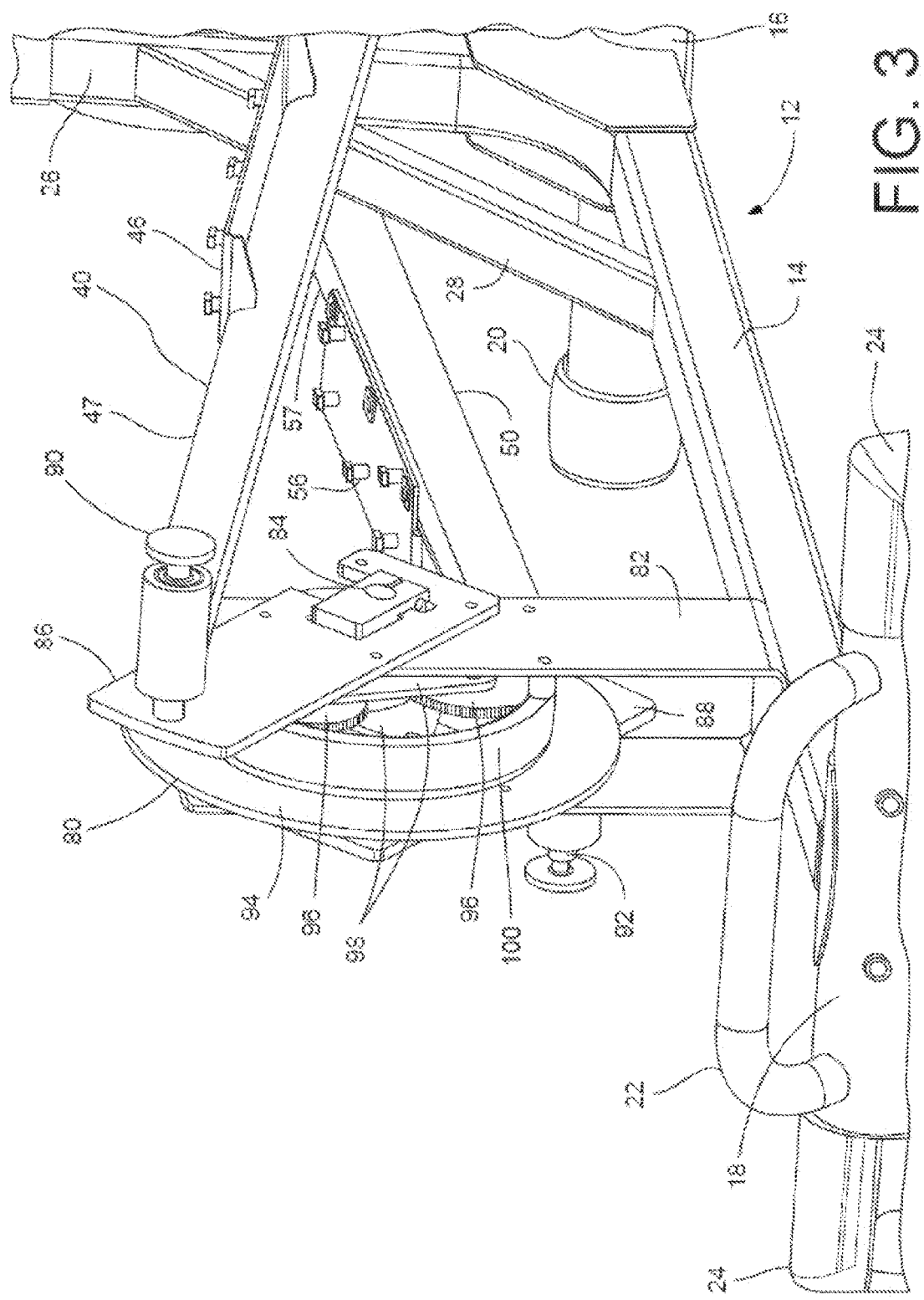
FIG. 3 is an enlarged right rear pictorial view of the elliptical exercise machine of FIG. 1.

When the users place their feet on foot pedals connected to the reciprocating foot supports 40, 50 at the foot pedal mounts 46, 56, and begin to stride, the reciprocating foot supports 40, 50 cause the crank arms 86, 88 to rotate the crank shaft 84 and drive the direct drive 80. As shown in FIG. 3, the direct drive 80 may include one or more planetary gear sets operatively connected to the crank shaft 84 to translate the rotation of the crank shaft 84 into rotation of a flywheel 94. The planetary gear sets may include combinations of sun gears (not shown, planet gears 96, planet carriers 98 and ring gears 100 to create a desired ratio of input rotations of the crank shaft 84 to output rotations of the flywheel 94.

Figure 4:
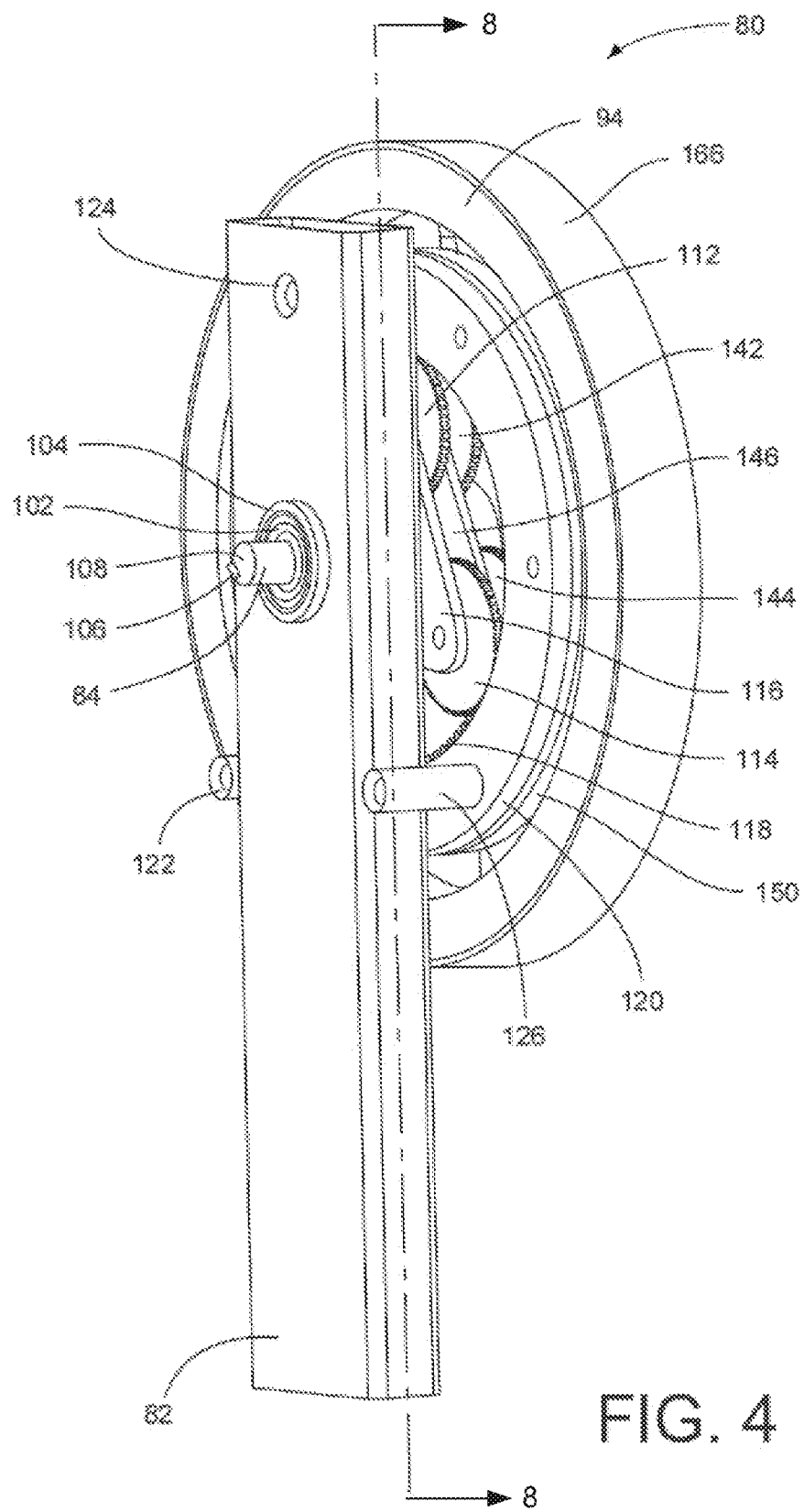
FIG. 4 is a pictorial view of the direct drive of the elliptical exercise machine of FIG. 1.

An embodiment of the direct drive 80 may be illustrated and described in more detail with reference to FIGS. 4-8. Referring to FIG. 4, the illustrated crank mount 82 and flywheel 94 of the direct drive 80 may have slightly different physical configurations than those illustrated in FIG. 3, but function in a similar manner in all relevant aspects with respect to the operation of the direct drive 80. An end of the crank shaft 84 extends beyond the crank mount 82, with the crank shaft 84 being rotatably mounted on the crank mount 82 by a bushing 102 retained within a bushing outer sleeve 104. Axial movement of the crank shaft 84 with respect to the bushing 102 may be restricted by a key 106 secured in an axial slot 108 engaging the bushing 102. A corresponding key and slot on the opposite end of the crank shaft 84 provides complete axial retention of the crank shaft 84. Other mechanism such as Cotter pins may similarly be used to provide the necessary retention of the crank shaft 84.

Figure 5:
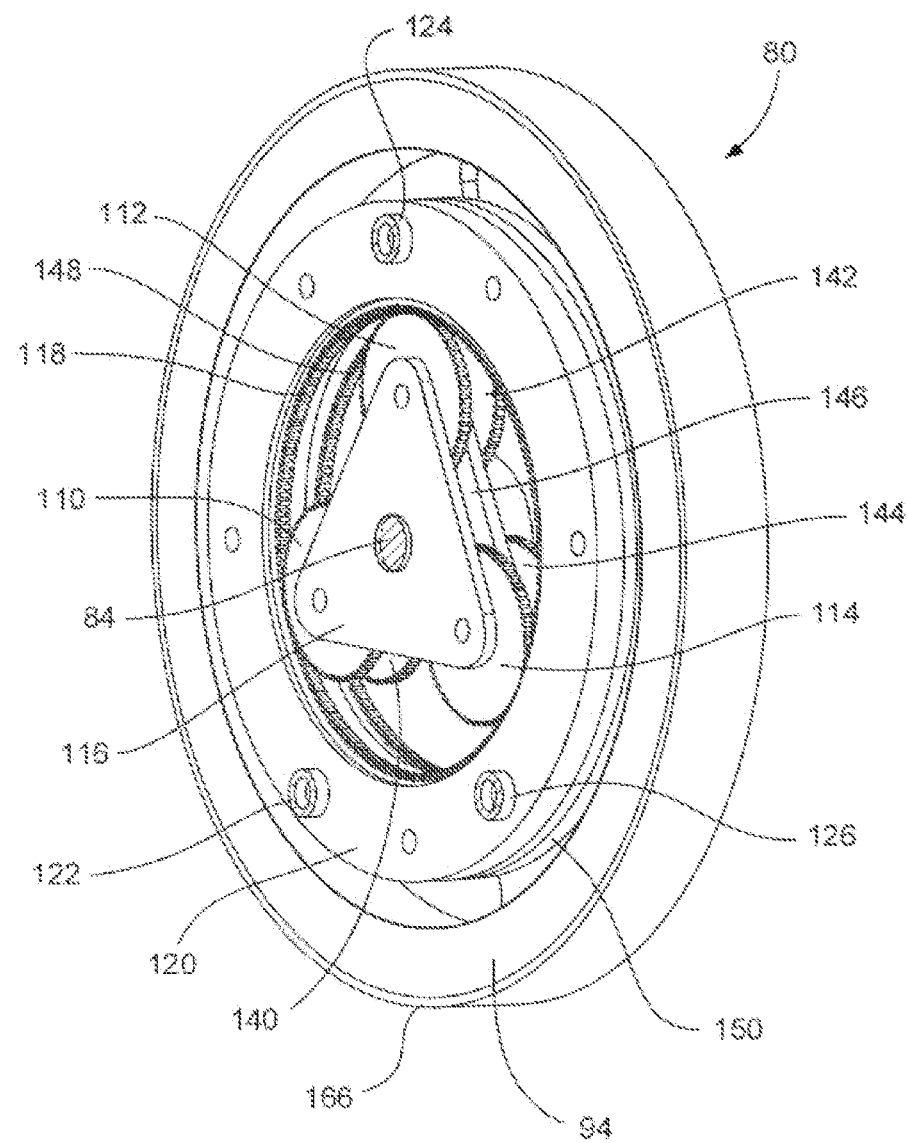
FIG. 5 is a pictorial view of the direct drive of FIG. 4 with the crank mount and a portion of the crank shaft removed.

FIG. 5 illustrates the direct drive 80 with the crank mount 82 and spacers 122-126 removed and the crank shaft 84 partially removed to show more of the elements of the first planetary gear set. The first planetary gear set may include one or more planet gears 110-114 circumferentially space about a sun gear (hidden) and rotatably mounted on a first triangular planet carrier 116. The first planet carrier 116 may be mounted on and secured to the crank shaft 84 for rotation with the crank shaft 84. The first planetary gear set may further include a first ring gear 118 disposed within a first annular ring outer housing 120, and encircling and meshing with the first planet gears 110-114. The first ring gear 118 and first ring outer housing 120 may be a single unitary component, or maybe separate components with the first ring gear 118 being inserted into and secured within the annular opening of the first ring outer housing 120. In the illustrated embodiment, the first ring gear 118 may be held stationary with respect to the crank mount 82 by a plurality of spacers 122-126 extending from the first ring outer housing 120 end engaging the crank mount 82.

Figure 6:
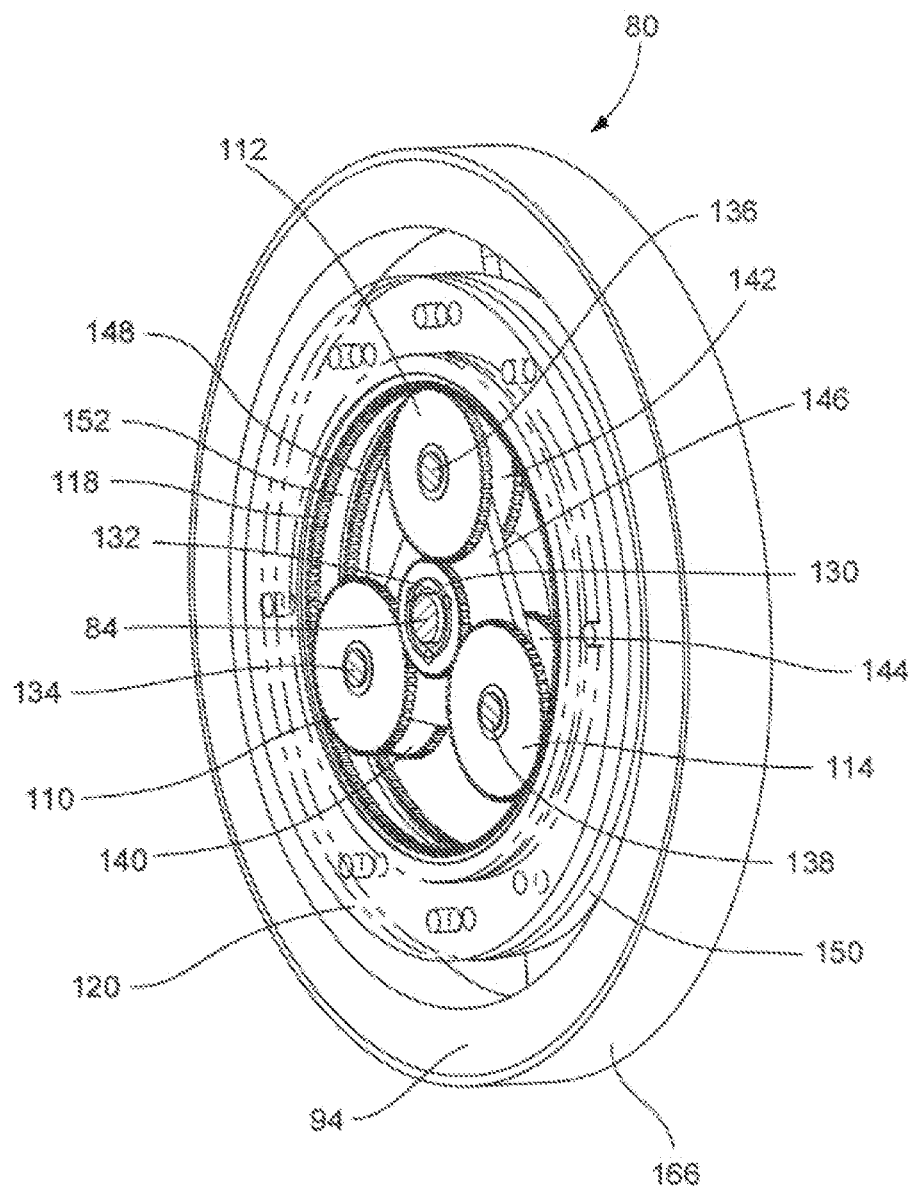
FIG. 6 is a pictorial view of the direct drive of FIG. 5 with the first planet carrier and a further portion of the crank shaft removed.

Referring to FIG. 6, the direct drive 80 is illustrated with the first planet carrier 116 removed to expose a first sun gear 130 of the first planetary gear set. The first sun gear 130 meshes with the planet gears 110-114 so that the rotation of the first sun gear 130 causes a corresponding rotation of the planet gears 110-114, and vice versa. The first sun gear 130 may be mounted on the crank shaft 84 with a bushing or spacer 132 to allow the first sun gear 130 and the crank shaft 84 to rotate independently of each other. With the first planet carrier 116 removed, portions of gear guides 134-138 that attach each of the corresponding first planet gears 110-114 to the first planet carrier 116 are shown.

The components of a second planetary gear set are also more clearly shown FIG. 6. The second planetary gear set may include one or more planet gears 140-144 circumferentially spaced and rotatably mounted on a second triangular planet carrier 146. The second planet carrier 146 may be rotatably mounted on the crank shaft 84 for rotation independent of the crank shaft 84. The second planetary gear set may further include a second ring gear 148 disposed within a second annular ring outer housing 150, and encircling and meshing with the second planet gears 140-144. The second ring gear 148 and second ring outer housing 150 may be a single unitary component or separate components, and may be separated from the first ring gear 118 and first ring outer housing 125 and annular spacer 152. Alternatively, the first and second ring gears 118, 148 and ring outer housings 120, 150 may be formed as a single unitary component with a single ring gear meshing with the planet gears 110-114 of the first planetary gear set and the planet gears 140-144 of the second planetary gear set. In either embodiment, however, the second ring gear 148 may be held stationary with respect to the crank mount 82 and the first ring gear 118. So the rotation of the second planet carrier 146 causes a corresponding rotation of the planet gears 140-144.

Figure 7:
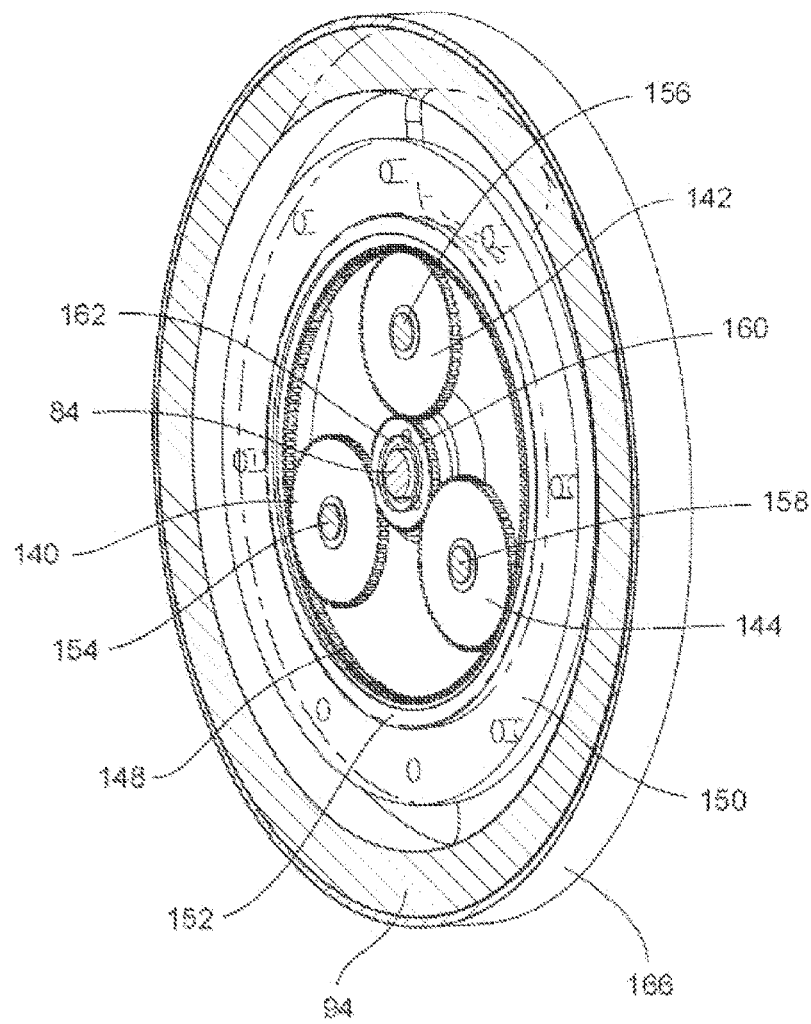
FIG. 7 is a pictorial view of the direct drive of FIG. 6 with the first planetary gear set and a portion of the crank shaft removed.
Figure 8:
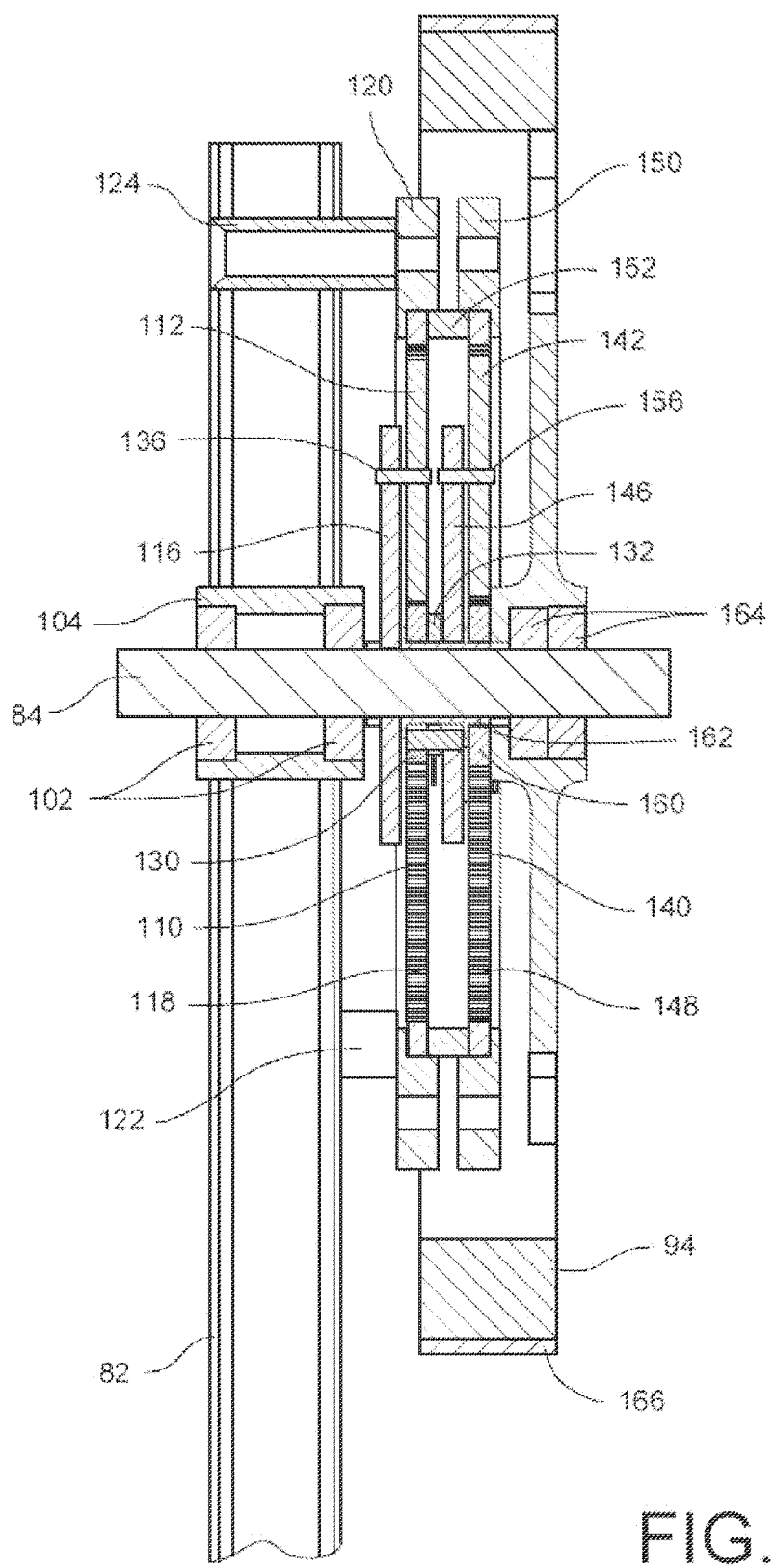
FIG. 8 is a cross-sectional view of the direct drive taken through line 8-8 of FIG. 4 and passing through a longitudinal axis of the crank shaft.

FIG. 7 illustrates the direct drive 80 with the remaining components of the first planetary gear set removed as well as the second planet carrier 146. With the second planet carrier 146 removed, portions of gear guides 154-158 on which each of the planet gears 140-144, respectively, are rotatably mounted to the second planet carrier 146 are visible. A second sun gear 160 of the second planetary gear set is also visible. The second sun gear 160 meshes with the planet gears 140-144. So that rotation of the second sun gear 160 causes a corresponding rotation of the planet gears 140-144, and vice versa. The second sun gear 160 may be mounted on the crank shaft 84 by a bushing or spacer 162 to allow the second sun gear 160 and the crank shaft 84 to rotate independently of each other. However, the second sun gear 160 may be secured to the flywheel 94 with bolts, welds or other connection mechanisms so that the flywheel 94 and second sun gear 160 rotate together about the crank shaft 84. The arrangement of the elements of the direct drive 80 may further be shown in a cross-sectional view of FIG. 8. The flywheel 94 may be rotatably mounted on the crank shaft 84 by bushings 164 allowing the flywheel 94 to rotate independently of the crank shaft 84. A flywheel band 166 may encircle the flywheel 94.

Figure 9:
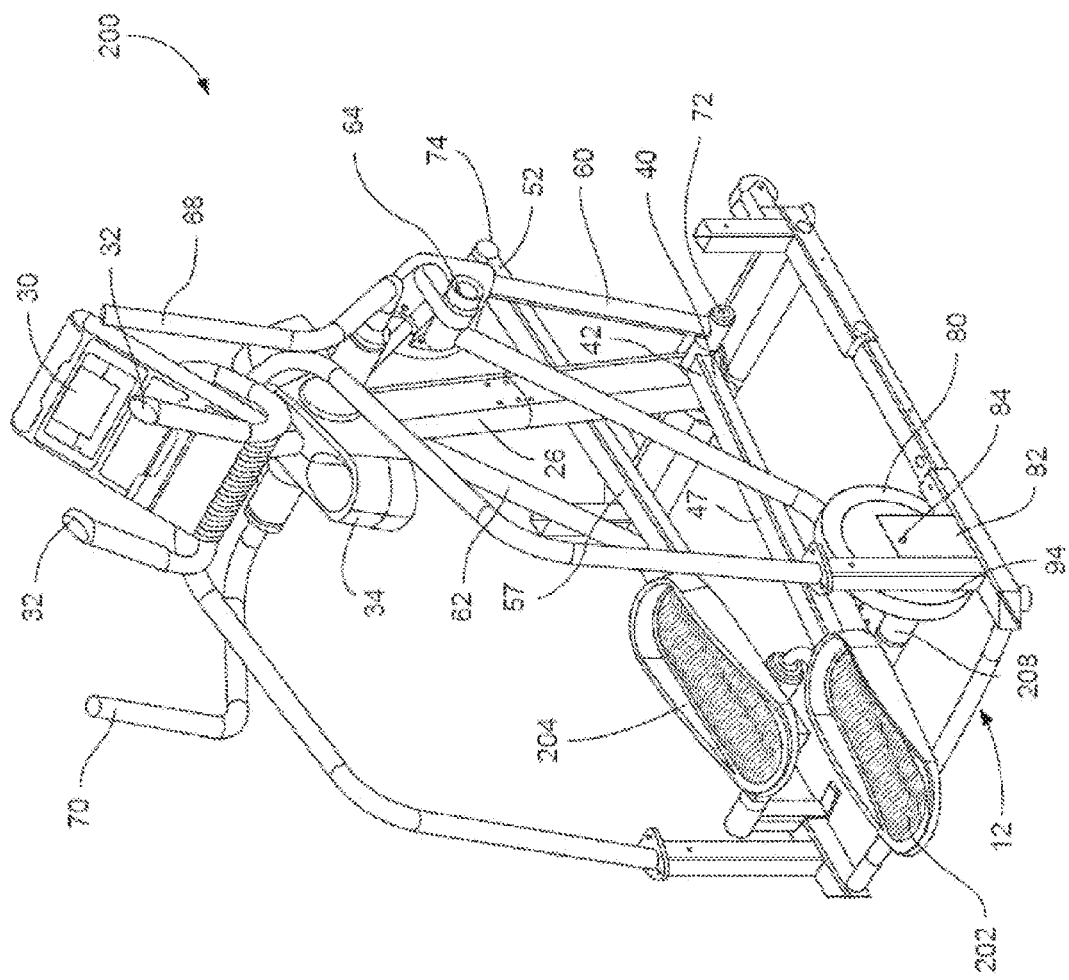
FIG. 9 is a pictorial view of an alternative embodiment of a mid mount elliptical exercise machine implementing a direct drive in accordance with the present disclosure.

As discussed above, the rear mount elliptical exercise machine 10 is just one example of an exercise machine in which the direct drive 80 in accordance with the present disclosure may be implemented. FIG. 9 illustrates an embodiment of a mid mount, or mid mechanical-type, elliptical exercise machine 200 implementing the direct drive 80. In FIG. 9, elements of the exercise machine 200 that correspond to elements of the exercise machine 10 as discussed above are identified with the same reference numerals. The exercise machine 200 includes foot pedals 202, 204 mounted on the upper surfaces 47, 57 of the reciprocating foot supports 40, 50, respectively, proximate the rear of the exercise machine 200. The direct drive 80 may be mounted by the crank mount 82 to the support structure 12 in front of the foot pedals 202, 204 proximate a middle area of the exercise machine 200.

The crank shaft 84 of the direct drive 80 may be operatively coupled to an element of the exercise machine 10 that moves in response to a user standing on the foot pedals and striding during a workout routine. For example, the crank shaft 84 may be operatively connected to a rear crank shaft 208 to which the second ends 44, 54 (hidden by foot pedals 202, 204) of the reciprocating foot supports 40, 50 are connected. A belt, chain or pulley may be connected between the crank shaft 84 and a portion of the crank shaft 208 that is axially aligned with an axis about which the crank shaft 208 rotates. Alternatively, a link may connect a portion of the crank shaft 208 that is offset from the rotational axis to a strut connected and extending perpendicular to the crank shaft 84 such that the crank shaft 84 makes one rotation for every rotation of the crank shaft 208. As a still further alternative, the crank shaft 84 may be operatively coupled to an intermediate portion of reciprocating foot support 40 to rotate the crank shaft 84 as the reciprocating foot support 40 moves through its path of motion. Particular linkages and other mechanisms for operatively coupling the moving components of the exercise machine 200 to the crank shaft 84 to provide input rotation to the direct drive 80 will be apparent to those skilled in the art, and are contemplated by the inventors as having us in the exercise machine 200.

Figure 10:
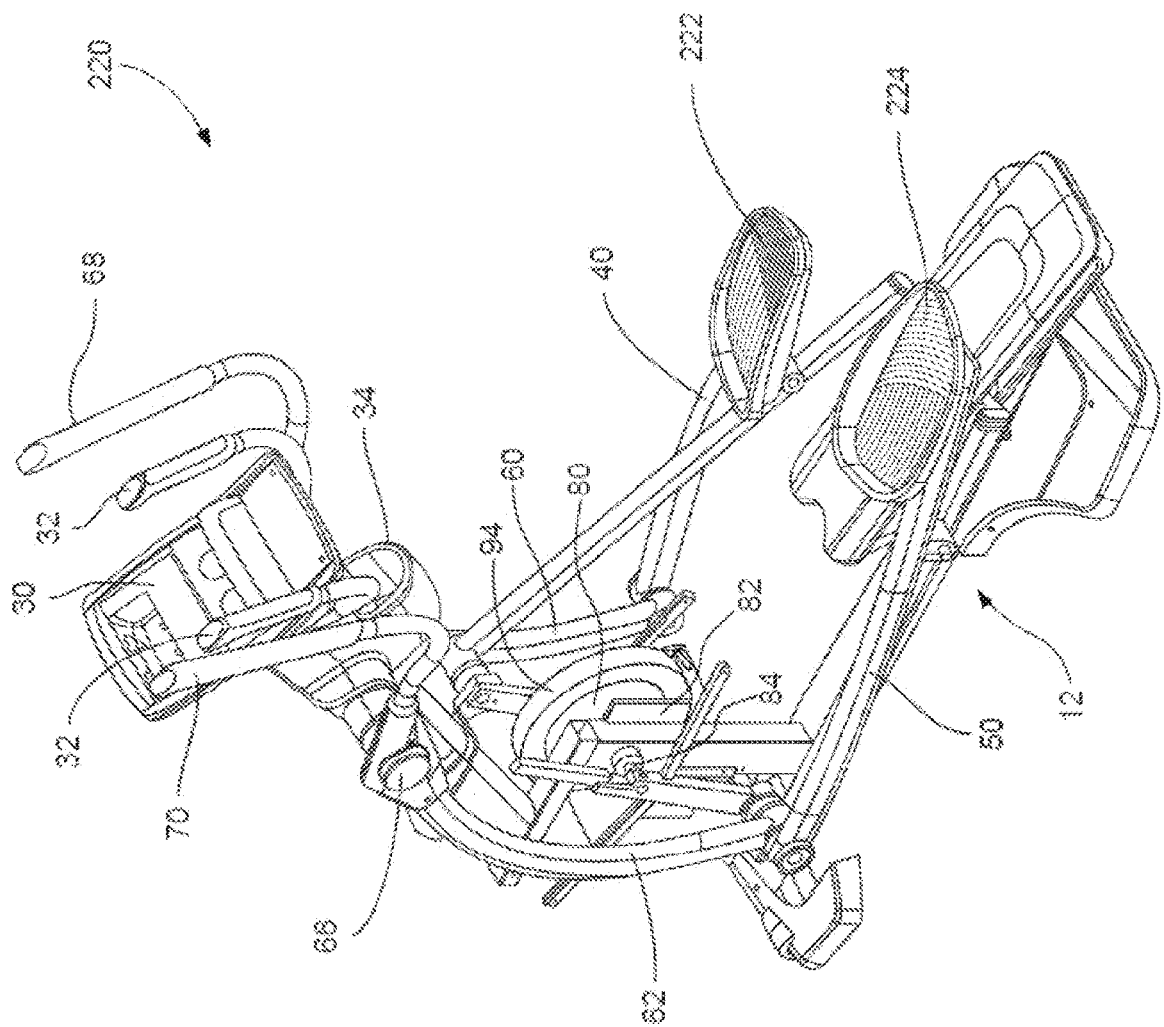
FIG. 10 is a pictorial view of a further alternative embodiment of a front mount elliptical exercise machine implementing a direct drive in accordance with the present disclosure.

FIG. 10 shows a further alternative of a front mount, or front mechanical-type, elliptical exercise machine 220 having the direct drive 80 mounted to the support structure 12 on the crank mount 82 proximate the front of the exercise machine 220. As in the previous embodiment, foot pedals 222, 224 may be disposed proximate the rear of the support structure 12 relative to the direct drive 80. Disposed at the front of the exercise machine 220, the direct drive 80 may have one of the moving components, such as the reciprocating foot supports 40, 50 or swing arms 60, 62, operatively coupled to the crank shaft 84 to provide the input rotation to the direct drive 80.

Figure 11:
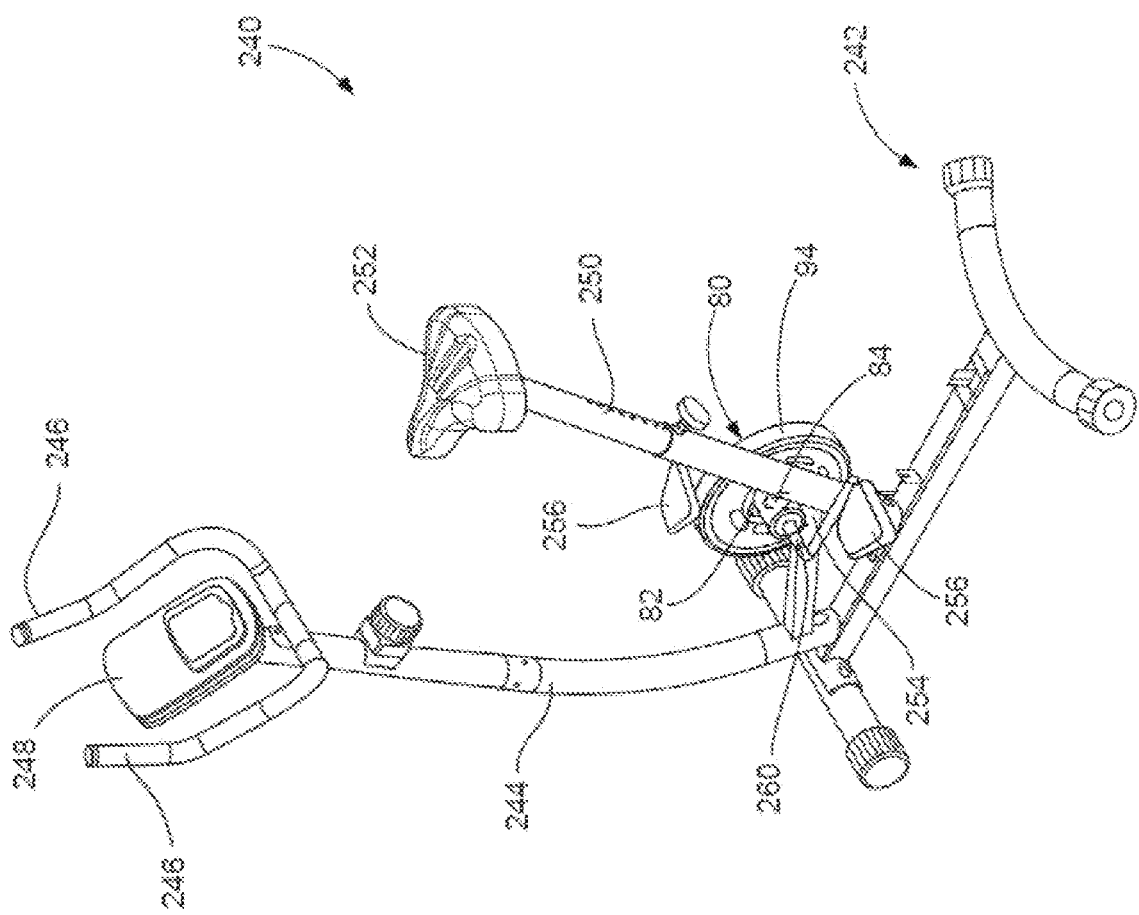
FIG. 11 is a pictorial view of an upright stationary exercise bicycle implementing a direct drive in accordance with the present disclosure.

As further discussed above, the direct drive 80 may be implemented in other types of exercise equipment in addition to the elliptical exercise machines illustrated and described above. FIG. 11 illustrates an upright stationary exercise bicycle 240 incorporating the direct drive 80. The upright exercise bicycle 240 includes a support structure 242 to which the direct drive 80 is mounted via the crank mount 82. The upright exercise bicycle 240 may further include a front vertical support 244 extending upwardly from the front end of the support structure 242, with handle bars 246 and a control console 248 mounted proximate a top end of the front vertical support 244. A second vertical support 250 may extend upwardly from the support structure 242 proximate the middle or rear of the support structure 242, and have a seat 252 with adjustable height mounted at the top of the second vertical support 250. In the upright exercise bicycle 240, a crank shaft 254 and pedals 256 may be mounted to the support structure 242 beneath the seat 252 so that the user sits upright to operate the upright exercise bicycle 240. A crank shaft 260 attached to the pedals 256 may be operatively connect to the crank shaft 84 of the direct drive 80 to provide input rotations to the direct drive 80 when a user pedals the upright exercise bicycle 240 during a workout. The connection between the crank shafts 84, 260 may be made by a belt, chain or any other appropriate coupling mechanism as will be apparent to those skilled in the art.

Figure 12:
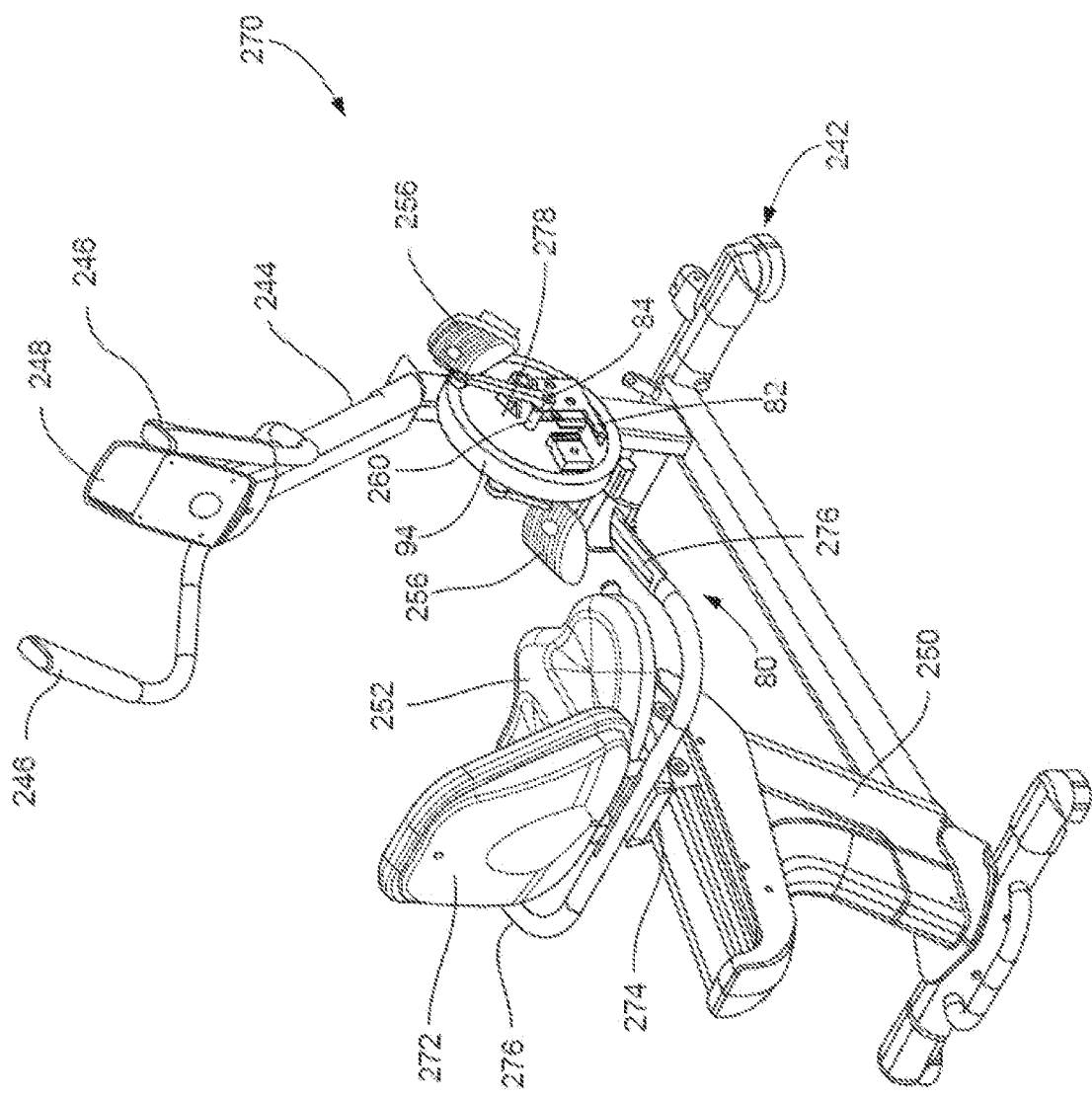
FIG. 12 is a pictorial view of a recumbent stationary exercise bicycle implementing a direct drive in accordance with the present disclosure.

FIG. 12 illustrates a further alternative exercise machine in the form of a recumbent stationary exercise bicycle 270. The recumbent exercise bicycle 270 has an ergonomic design that places the rider in a laid-back reclining position with their weight distributed comfortably over a large area with support for the back and buttocks. To achieve these benefits, the recumbent exercise bicycle 270 may have a wider seat 252 with an accompanying seat back 272 against which the rider may recline. A position adjustment mechanism 274 may allow the seat 252 be positioned for optimum workout effect based on the length of the rider's legs. Stationary handles 276 disposed on either side of the seat 252 offers further support and stability for the rider.

The reclining orientation of the rider may be further facilitated by repositioning the pedals 256, and direct drive 80. In contrast to the upright exercise bicycle 240, the pedals 256 and direct drive 80 are disposed toward the front of the support structure 242, and the pedals 256 may be elevated to further raise the legs of the rider to a comfortable position. Due to their proximity, the crank shaft 84 may be operatively connected the pedal crank shaft 260 by a belt 278 or other mechanism for translating the rotation of the crank shaft 260 to rotation in the direct drive 80. As previously discussed, the embodiments illustrated and described herein are exemplary of exercise machines in which the direct drive 80 may be implemented. Those skilled in the art will understand and be able to adapt the direct drive 80 to other types of exercise machines to translate motion by the user into rotation of the direct drive 80, and such adaptations are contemplated by the inventors.

INDUSTRIAL APPLICABILITY

The direct drive as illustrated in the drawing figures and described above translates the strides or other input motion of a user of an exercise machine into rotation of the flywheel. When the user stands on the foot pedals of an elliptical exercise machine, for example, and begins to make strides on the reciprocating foot supports, the crank arms cause the crank shaft to rotate relative to the crank mount. The first planet carrier is connected to the crank shaft, and consequently rotates with the crank shaft to move the planet gears relative to the first ring gear. The meshing of the teeth of the planet gears with the teeth of the first ring gear causes the planet gears to rotate about their respective gear guides. The teeth of the planet gears mesh with the teeth of the first sun gear to cause the first sun gear to rotate about the crank shaft at a rate determined by the gear ratio of the first planetary gear set. In the present example, the planet gears may have 72 teeth, the first ring gear may have 192 teeth, and the first sun gear may have 48 teeth, resulting in a planetary gear ratio of 5 to 1 based on formulas known to those skilled in the art. Consequently, with the first ring gear held stationary with respect to the crank mount, the first planetary gear set will output five revolutions of the first sun gear for every input revolution of the crank shaft and first planet carrier.

As discussed above, the first sun gear is connected to the second planet carrier. As a result, in response to the strides of the user of the elliptical exercise machine, the output rotations of the first sun gear caused by the input rotations of the crank shaft drive the second planetary gear set. In a similar manner as described above, rotation of the second planet carrier causes the planet gears to rotate relative to the second ring gear, with the planet gears rotating about the gear guides due to the meshing of the teeth of the planet gears and the second ring gear. Rotation of the planet gears causes corresponding rotations of the second sun gear about the crank shaft. Due to the connection of the second sun gear to the flywheel, the flywheel 94 rotates about the crank shaft at the same rate as the second sun gear, with the rate of rotation of the flywheel and second sun gear being determined based on the planetary gear ratio of the second planetary gear set. Therefore, if the second planetary gear set has the same 5 to 1 planetary gear ratio as a first planetary gear set, the flywheel will rotate through five revolutions per every revolution of the second sun gear and the second planet carrier.

Those skilled in the art will understand that the configuration and interconnection of the first and second planetary gear sets will result in a multiplier effect of the planetary gear ratios such that a given input speed by the user to the crank shaft may result in a relatively high rotational velocity of the flywheel. Assuming the 5 to 1 planetary gear ratios discussed above, the first sun gear and second planet carrier will make five rotations for each rotation of the crank shaft caused by a user striding through one cycle of the elliptical path. At the same time, the second sun gear and flywheel make five rotations for each rotation of the first sun gear and second planet carrier. As a result, the flywheel will make 25 rotations for each rotation of the crank shaft and stride of the user, giving the direct drive an overall gear ratio of 25 to 1.

The use of the planetary gear sets having gear ratios of 5 to 1 is exemplary, and those skilled in the art will understand that other planetary gear set configurations may be implemented in direct drive is in accordance with the present disclosure. For example, the individual planetary gear sets may have lower gear ratios, such as two planetary gear sets having 3 to 1 ratios and the direct drive having an overall ratio of 9 to 1, or greater gear ratios, such as to planetary gear sets having 7 to 1 ratios and the direct drive having an overall ratio of 49 to 1. Moreover, the first and second planetary gear sets may have different ratios in order to achieve a desired overall ratio for the direct drive. Consequently, where the first planetary gear set has a gear ratio of 5 to 1 and the second planetary gear set has a gear ratio of 7 to 1, or vice versa, the direct drive may have a resulting overall ratio of 35 to 1.

Those skilled in the art will understand that other variations of the planetary gear set arrangements in the direct drive are possible. Additional planetary gear sets may be mounted along the crank shaft and operatively coupled together with a similar multiplier effect to achieve a desired overall gear ratio. For example, three planetary gear sets each having a gear ratio of 3 to 1 may be coupled together to provide an overall gear ratio of 27 to 1. The planetary gear sets in the illustrated embodiment have the ring gears held stationary, but alternative embodiments may allow the ring gears to move relative to the crank mount while holding other components of the planetary gear sets stationary to achieve the desired relationship between the input rotations from the user and the output rotations to the flywheel. Consequently, in the example above, the first planet carrier of the first planetary gear set may be held stationary with respect to the crank mount, and the first ring gear may be allowed to rotate and may be operatively coupled to the crank shaft such that the strides of the user turn the crank shaft and the first ring gear. With the first planet carrier held in place, the first ring gear causes the planet gears to rotate about the gear guides and the first sun gear to rotate about the crank shaft at a ratio of 4 to 1 as will be apparent to those skilled in the art. If the configuration of the second planetary gear set remains the same, the overall ratio for the direct drive will be 20 to 1. Of course, the second planetary gears that may be reconfigured in a similar manner to yield a gear ratio of 4 to 1, and an overall gear ratio of 16 to 1. Additional configurations of the direct drive will be apparent to those skilled in the art and are contemplated by the inventors as having use in exercise machines in accordance with the present disclosure.

The direct drive as illustrated and described herein provides a compact arrangement for the driven elements of the exercise machine. No additional pulleys or belts are required to transfer the rotation of the driven elements to resistance mechanisms as was known in prior elliptical exercise machines. As a result, the driven components may be packaged more efficiently in a more compact housing structure.

The compaction of the driven elements may also facilitate reductions in the size of the support structure require for a piece of exercise equipment. As alternatives to the illustrated embodiments, the support structure may be any other suitable frame-like structure or other configuration capable of supporting the components of the exercise machine and a user of the machine. In addition, the support structure may comprise a unitary structure, or a plurality of components all coupled together or in groups. Essentially, the support structure may comprise any suitable design and is not meant to be limited in any way by the discussion herein.

What is claimed is:

1. An exercise machine, comprising:
a support structure;
a crank shaft rotatably mounted on the support structure;
a first planetary gear set, comprising:
a first sun gear rotatably mounted on the crank shaft,
a first planet carrier mounted on the crank shaft and secured thereto for rotation with the crank shaft,
a first planet gear rotatably mounted on the first planet carrier and meshing with the first sun gear, and
a first ring gear encircling and meshing with the first planet gear;
a second planetary gear set, comprising:
a second sun gear rotatably mounted on the crank shaft,
a second planet carrier rotatably mounted on the crank shaft,
a second planet gear rotatably mounted on the second planet carrier and meshing with the second sun gear, and
a second ring gear encircling and meshing with the second planet gear, wherein the first planetary gear set is operatively connected to the second planetary gear set such that an output rotation of the first planetary gear set causes an input rotation of the second planetary gear set; and
a flywheel rotatably mounted on the crank shaft and being operatively connected to the second planetary gear set such that output rotation of the second planetary gear set causes rotation of the flywheel.

2. The exercise machine of claim 1, wherein the first sun gear is secured to the second planet carrier for rotation therewith so that an output rotation of the first sun gear rotates the second planet carrier to cause an input rotation of the second planetary gear set, and wherein the second sun gear is secured to the flywheel for rotation therewith so that an output rotation of the second sun gear rotates the flywheel.

3. The exercise machine of claim 1, comprising:
a first crank arm having a first end rigidly attached to one end of the crank shaft and extending radially from the crank shaft and terminating at a second end;
a second crank arm having a first end rigidly connected to an opposite end of the crank shaft from the first crank arm and extending radially from the crank shaft in a direction 180° out of phase with the first crank arm and terminating at a second end;
a first reciprocating foot support having a first end pivotally linked to the second end of the first crank arm; and
a second reciprocating foot support having a first end pivotally linked to the second end of the second crank arm, wherein the first and second reciprocating foot supports each have second ends operatively connected to the support structure so that the first and second reciprocating foot supports travel about closed paths having a stride length upon rotation of the crank shaft.

4. The exercise machine of claim 1, wherein the first planetary gear set comprises three first planet gears rotatably mounted on and circumferentially spaced around the first planet carrier and meshing with the first sun gear and the first ring gear, wherein the second planetary gear set comprises three second planet gears rotatably mounted on and circumferentially spaced around the second planet carrier meshing with the second sun gear and the second ring gear.

5. The exercise machine of claim 1, wherein the first planetary gear set has a gear ratio of 5 to 1.

6. The exercise machine of claim 5, wherein the first sun gear comprises 48 gear teeth, the first planet gear comprises 72 gear teeth and the first ring gear comprises 192 gear teeth.

7. The exercise machine of claim 1, wherein the first ring gear comprises an annular first ring outer housing and a first inner ring gear having gear teeth and being disposed within the first ring outer housing.

8. The exercise machine of claim 1, wherein the second planetary gear set has a gear ratio of 5 to 1.

9. The exercise machine of claim 8, wherein the second sun gear comprises 48 gear teeth, the second planet gear comprises 72 gear teeth and the second ring gear comprises 192 gear teeth.

10. The exercise machine of claim 1, wherein the second ring gear comprises an annular second ring outer housing and a second inner ring gear having gear teeth and being disposed within the second ring outer housing.

11. The exercise machine of claim 1, wherein a first gear ratio of the first planetary gear set is equal to a second gear ratio of the second planetary gear set.

12. The exercise machine of claim 1, wherein a ratio of a number of rotations of the flywheel to a number of rotations of the crank shaft is 25 to 1.

13. The exercise machine of claim 10, wherein the first planetary gear set has a gear ratio of 5 to 1.

14. The exercise machine of claim 1, wherein a ratio of a number of rotations of the flywheel to a number of rotations of the crank shaft is 49 to 1.

15. The exercise machine of claim 1, wherein a first gear ratio of the first planetary gear set is not equal to a second gear ratio of the second planetary gear set.

16. The exercise machine of claim 1, wherein the crank shaft, the first and second planetary gear sets and the flywheel are disposed proximate a rearward end of the support structure.

17. The exercise machine of claim 1, wherein the crank shaft, the first and second planetary gear sets and the flywheel are disposed proximate a forward end of the support structure.

18. An elliptical exercise machine, comprising:
a support structure;
a crank shaft rotatably mounted on the support structure;
a first planetary gear set operatively coupled to the crank shaft so that the crank shaft provides an input for the first planetary gear set;
a second planetary gear set operatively coupled to the first planetary gear set so that an output of the first planetary gear set provides an input for the second planetary gear set; and
a flywheel rotatably operatively coupled to the second planetary gear set so that an output of the second planetary gear set rotates the flywheel.

19. The elliptical exercise machine of claim 18, comprising:
a first crank arm having a first end rigidly attached to one end of the crank shaft and extending radially from the crank shaft and terminating at a second end;
a second crank arm having a first end rigidly connected to an opposite end of the crank shaft from the first crank arm and extending radially from the crank shaft in a direction 180° out of phase with the first crank arm and terminating at a second end;
a first reciprocating foot support having a first end pivotally linked to the second end of the first crank arm; and
a second reciprocating foot support having a first end pivotally linked to the second end of the second crank arm, wherein the first and second reciprocating foot supports each have second ends operatively connected to the support structure so that the first and second reciprocating foot supports travel about closed paths having a stride length upon rotation of the crank shaft.

20. The elliptical exercise machine of claim 19, wherein a ratio of a number of rotations of the flywheel to a number of rotations of the crank shaft is 25 to 1.

21. The elliptical exercise machine of claim 19, wherein a first gear ratio of the first planetary gear set is equal to a second gear ratio of the second planetary gear set.

22. A direct drive mechanism for an elliptical exercise machine, comprising:
- a crank shaft rotatably mounted on a support structure of the elliptical exercise machine;
- a first planetary gear set, comprising:
  - a first sun gear rotatably mounted on the crank shaft,
  - a first planet carrier mounted on the crank shaft and secured thereto for rotation with the crank shaft, three first planet gears rotatably mounted on and circumferentially spaced around the first planet carrier and meshing with the first sun gear, and
  - a first ring gear encircling and meshing with the first planet gears;
- a second planetary gear set, comprising:
  - a second sun gear rotatably mounted on the crank shaft,
  - a second planet carrier rotatably mounted on the crank shaft and having the first sun gear secured thereto for rotation there with, three second planet gears rotatably mounted on and circumferentially spaced around the second planet carrier and meshing with the second sun gear, and
  - a second ring gear encircling and meshing with the three second planet gears; and
- a flywheel rotatably mounted on the crank shaft and having the second sun gear secured thereto for rotation there with.

23. The direct drive mechanism of claim 22, comprising:
- a first crank arm having a first end rigidly attached to one end of the crank shaft and extending radially from the crank shaft and terminating at a second end; and
- a second crank arm having a first end rigidly connected to an opposite end of the crank shaft from the first crank arm and extending radially from the crank shaft in a direction 180° out of phase with the first crank arm and terminating at a second end.

* * * * *